US011783315B2

(12) United States Patent
Deniz et al.

(10) Patent No.: US 11,783,315 B2
(45) Date of Patent: Oct. 10, 2023

(54) TRANSACTION SYSTEM ARCHITECTURE AND METHODS

(71) Applicant: Mastercard Asia/Pacific Pte. Ltd., Singapore (SG)

(72) Inventors: Shane Lansley Jorge Deniz, Dubai (AE); Matteo Valenti, Dubai (AE); Pankaj Asthaana, Dubai (AE); Nishit Doshi, Dubai (AE)

(73) Assignee: Mastercard Asia/Pacific Pte. Ltd., Singapore (SG)

( * ) Notice: Subject to any disclaimer, the term of this patent is extended or adjusted under 35 U.S.C. 154(b) by 795 days.

(21) Appl. No.: 16/114,901

(22) Filed: Aug. 28, 2018

(65) Prior Publication Data
US 2019/0073650 A1 Mar. 7, 2019

(30) Foreign Application Priority Data

Sep. 7, 2017 (EP) ..................................... 17189884

(51) Int. Cl.
*G06Q 20/32* (2012.01)
*G06Q 20/36* (2012.01)
*G06Q 20/10* (2012.01)
*G06Q 20/40* (2012.01)

(52) U.S. Cl.
CPC ....... *G06Q 20/3276* (2013.01); *G06Q 20/102* (2013.01); *G06Q 20/322* (2013.01); *G06Q 20/3674* (2013.01); *G06Q 20/4014* (2013.01)

(58) Field of Classification Search
CPC .................................................. G06Q 20/3276
See application file for complete search history.

(56) References Cited

U.S. PATENT DOCUMENTS

| 9,359,074 | B2* | 6/2016 | Ganesh | G05D 1/0022 |
| 10,949,830 | B1* | 3/2021 | Gaudin | G06Q 20/327 |
| 2007/0022058 | A1* | 1/2007 | Labrou | G06Q 20/322 |
| | | | | 705/67 |
| 2009/0240598 | A1* | 9/2009 | Kargman | G06Q 30/0601 |
| | | | | 705/40 |
| 2011/0251892 | A1 | 10/2011 | Laracey | |
| 2012/0203697 | A1 | 8/2012 | Morgan et al. | |

(Continued)

FOREIGN PATENT DOCUMENTS

| CN | 105894275 A | 8/2016 | |
| KR | 20060111749 A | * 10/2006 | ............. A43B 17/10 |

OTHER PUBLICATIONS

"PCT International Search Report and Written Opinion" dated Dec. 3, 2018, International Searching Authority, for International Application No. PCT/SG2018/050455, 16pgs.

(Continued)

*Primary Examiner* — Jay Huang
(74) *Attorney, Agent, or Firm* — Barta, Jones & Foley, PLLC

(57) ABSTRACT

A method of performing a transaction between a merchant and a customer is described. The method involves a customer computing device (11), a merchant computing device (12) and a payment facilitator computing system (19). Firstly, there is agreement upon a transaction between the customer computing device (11) and the merchant computing device (12), wherein a first one of said computing devices produces a code image representing elements of the transaction.

20 Claims, 8 Drawing Sheets

(56) References Cited

U.S. PATENT DOCUMENTS

| | | |
|---|---|---|
| 2012/0209749 A1 | 8/2012 | Hammad et al. |
| 2013/0238455 A1* | 9/2013 | Laracey ............... G06Q 20/102 |
| | | 705/21 |
| 2014/0236767 A1* | 8/2014 | Duggal ................ G06Q 20/322 |
| | | 705/26.61 |
| 2016/0005043 A1 | 1/2016 | Goldstone et al. |
| 2017/0032350 A1 | 2/2017 | Moshal |
| 2018/0357714 A1* | 12/2018 | So ........................... G06F 17/18 |

OTHER PUBLICATIONS

Lee, Jaesik et al., "Secure Quick Response-Payment(QR-Pay) System using Mobile Device", Department of Computer Science, SoongSil University, Seoul, South Korea, ICACT, Feb. 13-16, 2011, 4 pp.

Extended European Search Report for EP Application No. 17189884.4 dated Nov. 13, 2017, 9 pp.

\* cited by examiner

TRANSACTION SYSTEM ARCHITECTURE AND METHODS

CROSS-REFERENCE TO RELATED APPLICATION

This application is a U.S. National Stage filing under 35 U.S.C. § 119, based on and claiming benefits of and priority to European Patent Application No. 17189884.4 filed on Sep. 7, 2017. The entire disclosure of the above application is incorporated herein by reference for all purposes.

FIELD OF DISCLOSURE

The present disclosure relates to a transaction system architecture and methods for its use, in particular user registration and transaction performance. Embodiments of the disclosure are particularly relevant to use with merchant systems and their customer interfaces.

BACKGROUND OF DISCLOSURE

For transactions other than in-store transactions, merchants typically provide their services to a consumer through a merchant website or a merchant app, typically provided to the consumer over a home computer or, most typically, a smartphone. When ordering through such a website, a user typically needs either to order as a guest, or as a registered user. Both of these approaches have difficulties.

If a user orders as a guest, no payment details are stored, and the user generally needs to enter full details of their payment card in order to complete checkout, with provision of the card security code (CVC2 for MasterCard) used as a user credential. This process is relatively slow for the user, and offers limited ability to use other security mechanisms.

If a user registers, then subsequent orders may provide a rapid and effective user experience, potentially allowing rapid authentication mechanisms such as TouchID and easy use of a digital wallet using a system such as MasterPass, preferably with an express checkout system such as that provided by MasterPass Express. However, while this provides a good user experience, qualification of a merchant to provide MasterPass or MasterPass Express through a merchant website is relatively time consuming, as merchant qualification needs to be sufficiently stringent to ensure that the transaction system and sensitive data is not compromised and that the merchant systems provide a proper interface to the transaction system.

Such issues are particularly significant for small merchants, and can provide a significant barrier to entry for use of such systems. It would be desirable to find an approach that provided effective and secure registration and use of such payment mechanisms in such a way as to be straightforward and effective for both the user (customer) and the merchant, particularly in cases where ordering and provision of goods and services is separated.

SUMMARY OF DISCLOSURE

In a first aspect, the disclosure provides a method of performing a transaction between a merchant and a customer involving a customer computing device, a merchant computing device and a payment facilitator computing system, wherein the method comprises: agreement upon a transaction between the customer computing device and the merchant computing device, wherein a first one of said computing devices produces a code image representing elements of the transaction; authenticating a user of a second one of said computing devices with the payment facilitator computing system using the second computing device; scanning the code image at the second computing device and providing the elements of the transaction to the payment facilitator computing system; the payment facilitator computing system initiating the transaction by using the elements of the transaction in the code image and the authentication of the user of the second computing device. In embodiments, the first computing device is the merchant computing device and the second computing device is the customer computing device.

This approach is highly effective as it allows pre-qualification of an authentication and payment solution that can be used as a service by many merchants, saving individual merchants from the complexity of a full merchant qualification process, while also providing a rapid and secure purchase experience for the user that is also very well adapted for inclusion in a variety of use models.

In embodiments, the customer computing device comprises a digital wallet application, and wherein payment is initiated using transaction card details provided by the digital wallet application.

The code image may be a QR code. The code image may be static, and comprise elements associated with the first computing device but not elements that are specific to the transaction. Alternatively, the code image may be dynamic, and comprise not only elements associated with the first computing device but also elements that are specific to the transaction.

In embodiments, agreement upon the transaction may take place before provision of goods or services to the customer, and scanning the code image and initiating the transaction may then take place after provision of goods or services to the customer. In one such case, the code image is provided to a delivery agent for scanning by the customer, and wherein the customer and the delivery agent are notified on success of the transaction. Such a transaction may comprise payment for goods delivered by the merchant to the customer, or may comprise payment for services provided by the delivery agent to the customer.

In a second aspect, the disclosure provides a payment facilitator computing system for facilitating transactions between a merchant and a customer involving a customer computing device and a merchant computing device; wherein the payment facilitator computing system is adapted to manage user identities for customers and obtain customer authentication, and is further adapted to initiate a transaction for the merchant on receiving transaction details agreed between the merchant and the customer on authentication of the customer with the payment facilitator computing system.

Such a payment facilitator computing system may be adapted to receive transaction details comprising elements provided by the merchant to the customer as a coded image.

Such a payment facilitator computing system may provide a user interface for inclusion in third party systems to allow users of third party applications to be directed to the payment facilitator computing system for performance of a transaction.

Such a payment facilitator computing system may be adapted to receive notification of the success of the transaction, and in turn to provide notification to the customer and the merchant, or an agent of the merchant. Such notification of success may be provided to a computing device of the agent of the merchant, wherein the agent of the merchant directly provides the goods or services to the customer.

In a third aspect, the disclosure provides a customer computing device adapted to perform functions specified for the customer computing device according to the first aspect of the disclosure.

Such a customer computing device may be adapted for performing a transaction with a merchant for the customer by interacting with a merchant computing device and a payment facilitator computing system disclosure, wherein the customer computing device may then comprise a processor and a memory and be adapted to: agree a transaction with the merchant computing device; authenticate a user with the payment facilitator computing system; scan a code image provided by the merchant, wherein the code image comprises elements of the transaction, and provide the elements of the transaction to the payment facilitator computing system for it to initiate the transaction.

The customer computing device may comprise a digital wallet application, and wherein payment may then be initiated using transaction card details provided by the digital wallet application.

In embodiments, the code image may be static, and comprise elements associated with the first computing device but not elements that are specific to the transaction. In other embodiments, the code image may be dynamic, and comprise not only elements associated with the first computing device but also elements that are specific to the transaction.

In embodiment, agreement upon the transaction may take place before provision of goods or services to the customer, and scanning the code image and initiating the transaction may take place after provision of goods or services to the customer, whereby the code image may then be provided to a delivery agent for scanning by the customer computing device, and wherein the customer computing device may receive notification on success of the transaction.

In a fourth aspect, the disclosure provides a merchant computing device adapted to perform functions specified for the merchant computing device according to the first aspect of the disclosure.

BRIEF DESCRIPTION OF FIGURES

Embodiments of the disclosure will now be described, by way of example, with reference to the accompanying Figures, of which.

DESCRIPTION OF SPECIFIC EMBODIMENTS

Figure 1:
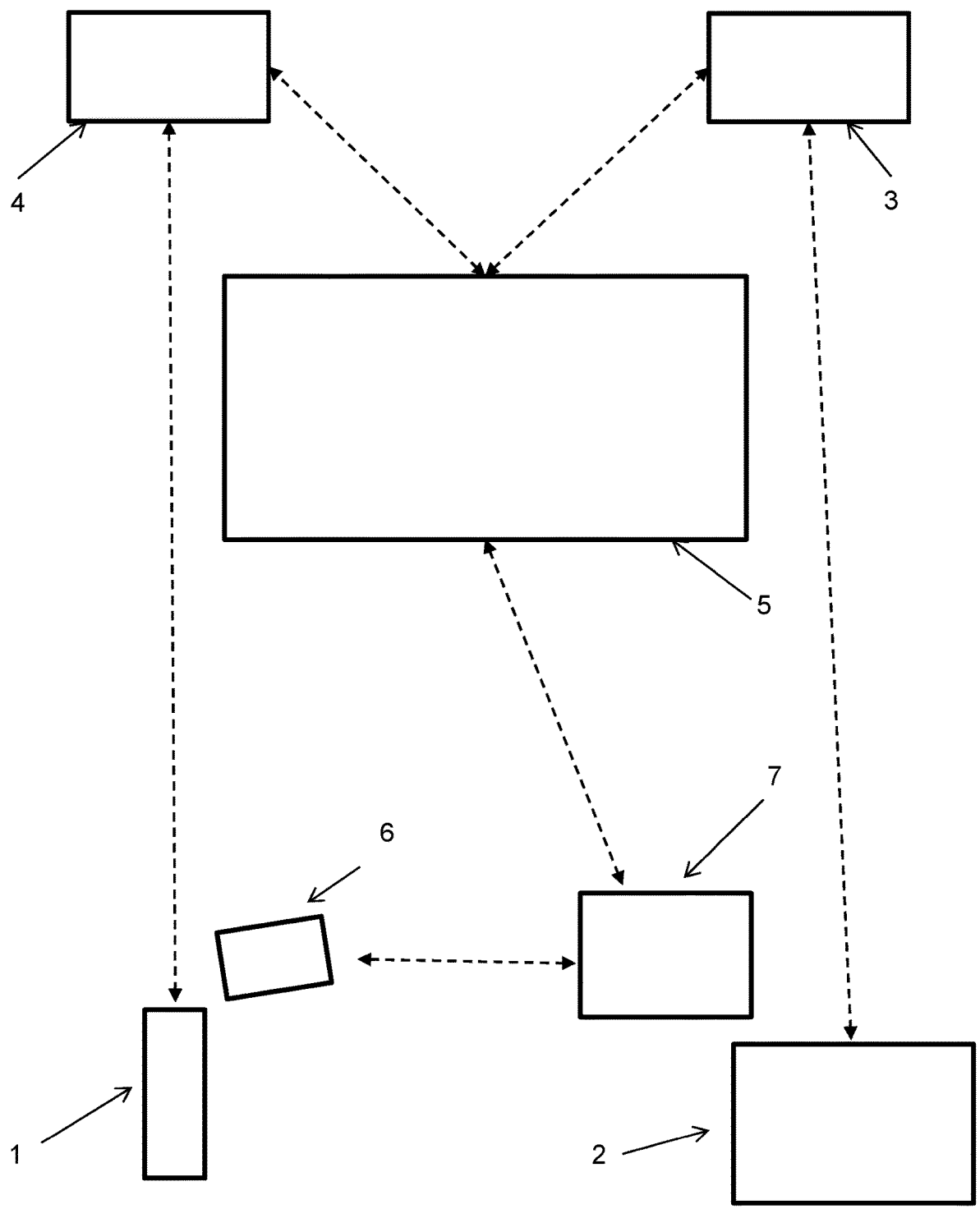
FIG. 1 shows the elements of the four-party model used in conventional transaction systems.

FIG. 1 summarises the elements of a conventional four-party card scheme supported by a transaction infrastructure provider. A cardholder 1 holds a payment card 6 (or other payment device) based on an account with a card issuer 4. The cardholder 1 transacts with a merchant 2, for example using the cardholder's payment card 6 interacting with a point of sale (POS) terminal 7 of the merchant 2. Many other forms of cardholder to merchant interaction can be supported by this type of card scheme—for example, purchases made from a cardholder computing device interacting with a merchant server—using appropriate additional infrastructural elements, as will be seen in FIG. 2. The merchant 2 is provided with payment services by an acquiring bank (acquirer) 3. Settlement takes place between the acquirer 3 and the issuer 4 after completion of the transaction. The transaction infrastructure 5 is operated by a scheme provider, who provides the rules for operation of the scheme and operates switches within the transaction infrastructure (managing communication between the acquirer 3 and the issuer 4 at least).

Figure 2:
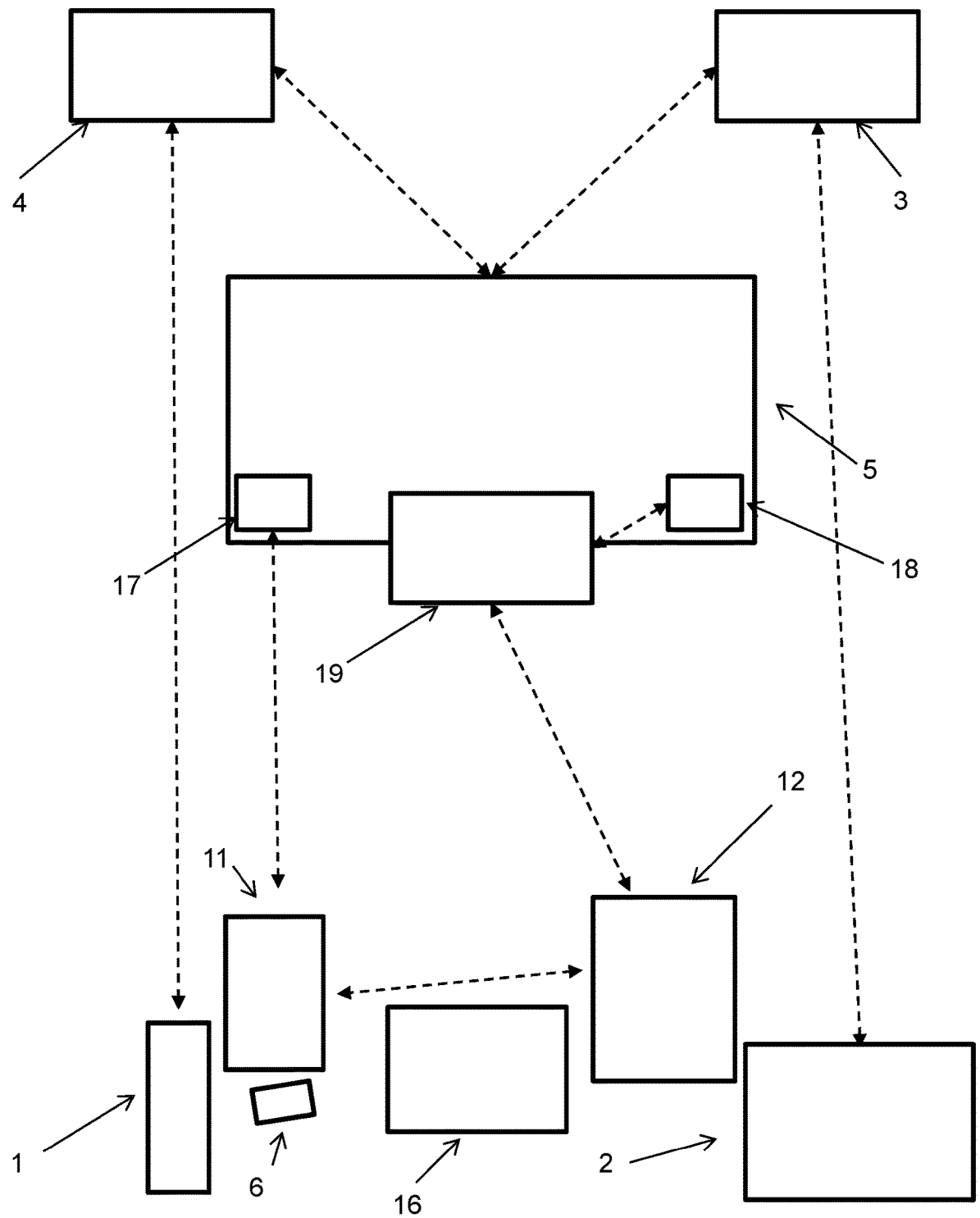
FIG. 2 shows elements of a transaction system architecture using embodiments of the disclosure.

Additional parties may have a role in a four-party system model, for example in providing a service to one or more of the parties, or where a party delegates a part of its function to a service provider. FIG. 2 shows an architecture according to an embodiment of the disclosure adapted for online transactions between a cardholder customer using their computing device and a merchant server providing an ordering interface for customers.

The cardholder 1 uses their computing device—which may be any or all of a cellular telephone handset, a tablet, a laptop, a static personal computer or any other suitable computing device (here a cellular telephone handset or smartphone 11 is shown) to interact with a merchant server 12 representing the merchant 2 over any appropriate network connection, such as the public internet. In embodiments, the merchant 2 may be represented by individual service providers 16 such as taxi drivers or delivery agents—these may also need to be equipped to communicate digitally with the merchant server 12 or other system elements. The transaction infrastructure 5 provides not only the computing infrastructure necessary to operate the card scheme and provide routing of transactions and other messaging to parties such as the acquirer 3 and the issuer 4, but also a wallet service 17 to support a digital wallet on the cardholder computing device, and an internet gateway 18 to accept internet based transactions for processing by the transaction infrastructure. An additional system element provided in embodiments of the disclosure is a payment facilitator server 19—this is shown associated with the transaction infrastructure, but may be provided by a party other than the scheme provider, provided that an appropriate trust relationship exists between the scheme provider and the payment facilitator, and that the payment facilitator is compliant with scheme rules. In other embodiments, the wallet service 17 may be provided similarly by a third party with an appropriate trust relationship with the transaction scheme provider.

Operation of the payment facilitator server 19 will be described in detail further below, but in essence its role is to assume certain responsibilities currently taken by the merchant server, allowing the merchant server to use a standard solution provided by the payment facilitator server 19 that is known to be compliant with scheme rules and acceptable to the scheme provider so that qualification and approval of the merchant server solution is limited or even not required. The payment facilitator provides a pre-qualified solution that may be built in to the merchant interface provided by the merchant server to a user, either by a direct call to a solution provider application or by providing an application programmer interface for the solution provider service that can be used in construction of the merchant server solution. In embodiments, the payment facilitator server 19 creates User IDs and provides validation on behalf of participating merchants. The payment facilitator server process may be pre-approved to allow user access to rapid payment protocols such as Masterpass Express Checkout (again meaning that the merchant server solution itself does not need to be pre-qualified for such protocols). The payment facilitator server may then initiate the actual purchase transaction, and subsequently provide success status and downstream reporting to the parties. As will be described below, this process is particularly effective to allow rapid set-up to allow transactions to be initiated using QR codes. This is particularly significant as merchants most suited to transactions by QR code are also those who may particularly require simplification of development and qualification of the merchant server interface.

Figure 3A:
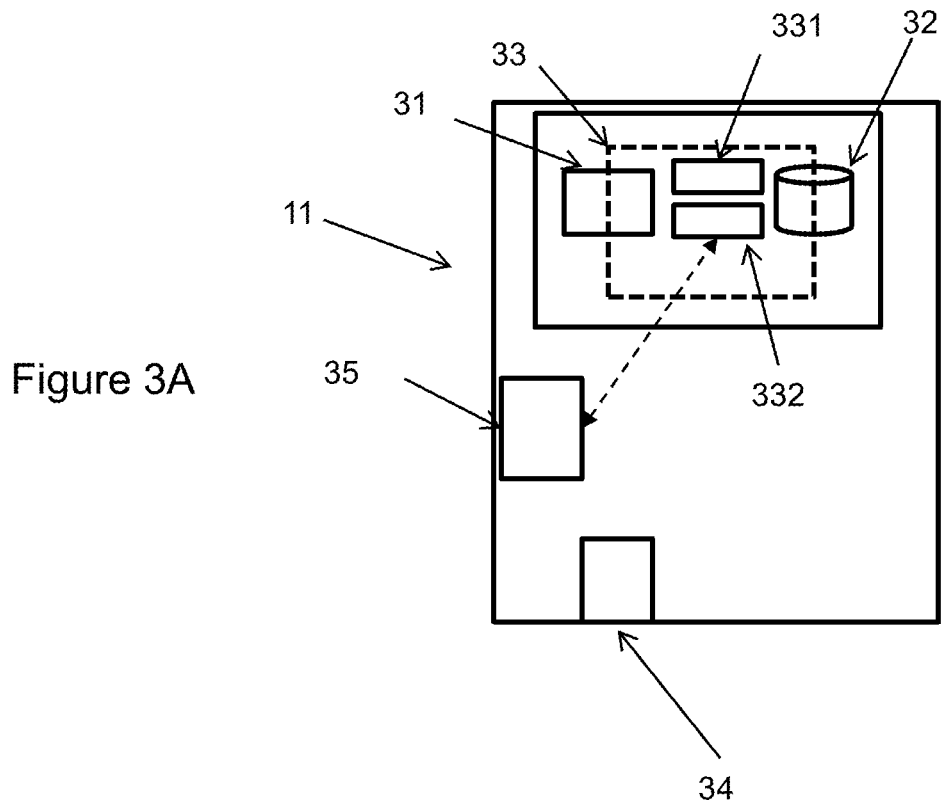
FIGS. 3A, 3B and 3C illustrate a user computing device, a payment facilitator server and a merchant server suitable for use in implementing embodiments of the disclosure.
Figure 3B:
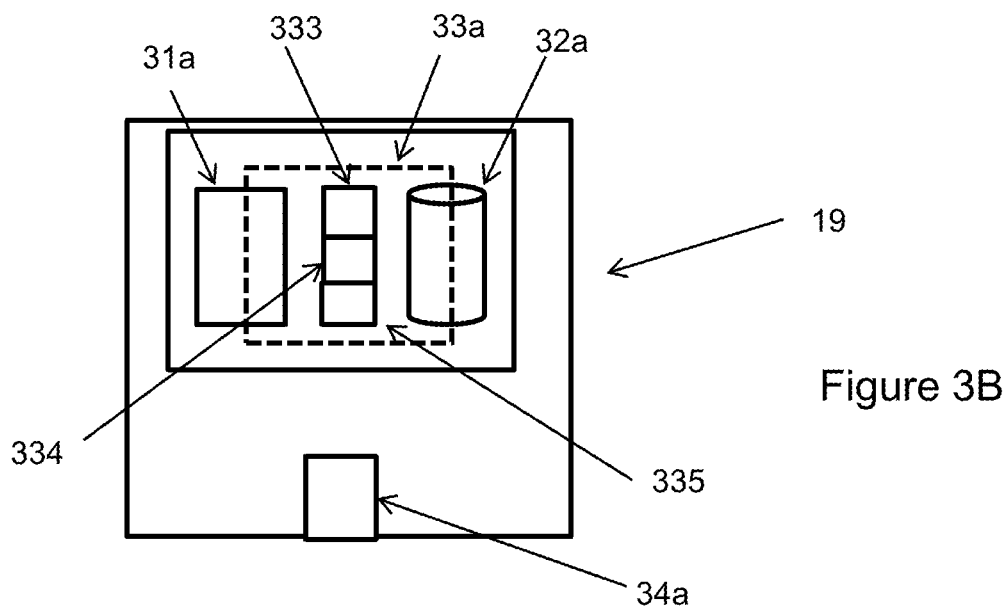
Figure 3C:
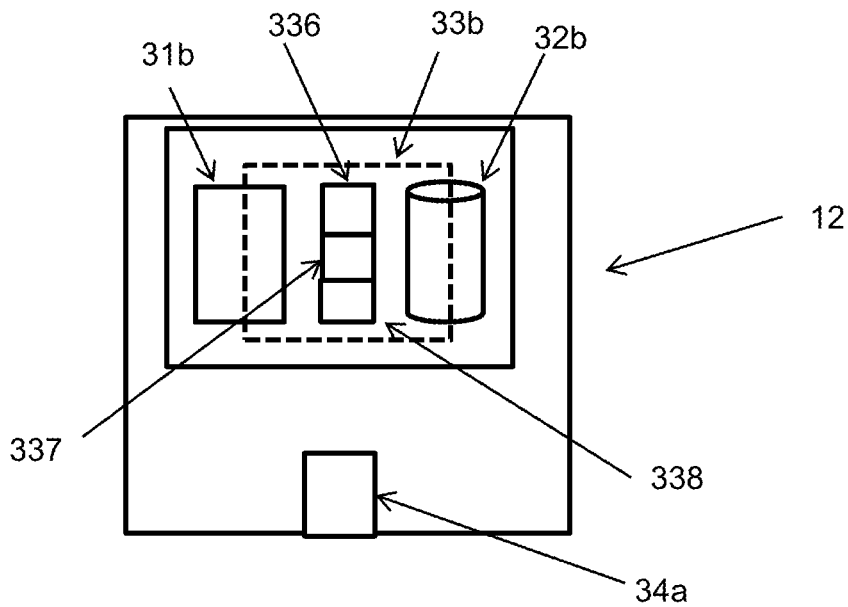

FIGS. 3A, 3B and 3C illustrate schematically by function a user computing device, a payment facilitator server and a merchant server suitable for use in implementing embodiments of the disclosure.

FIG. 3A shows a user computing device, in this case a smartphone 11. The smartphone possesses at least one processor 31 and at least one memory 32, between them defining a computing environment 33 for performance of applications. Applications running in the computing environment include a wallet application 331 and a biometric application 332. The computing environment may include or have associated secure environments and memories for processing and handling of sensitive information—these may be implemented in a variety of ways (as the skilled person will appreciate) and are not shown explicitly here, but access to secure data handling will typically be required by both a wallet application and a biometric application. The smartphone 11 is of course adapted for cellular communication (and generally also short range wireless communication) and has a wireless communication system 34. The smartphone 11 also here has a biometric sensor, in this case fingerprint reader 35. Other conventional elements of a smartphone device (such as a touchscreen user interface) are present but not described explicitly here.

FIG. 3B shows a payment facilitator server 19. The payment facilitator server 19 also possesses at least one processor 31a and at least one memory 32a, between them defining a computing environment 33a for performance of applications. The applications here include a user management application 333, a merchant system interface application 334, and a payment gateway application 335. The payment facilitator server 19 communicates, typically over a network interface 34a (which may include, for example, a wireless interface for cellular communications) with users and merchant servers—these communications may use encryption or use dedicated channels as necessary to meet security requirements. The payment gateway application 335 allows transactions to be managed at the payment facilitator server and initiated with the internet payment gateway at the point required. The user management application 333 allows authentication of and interaction with users, whereas the merchant system interface application 334 enables interaction between the merchant system and the payment facilitator. Both the user management application 333 and the payment gateway application 335 will need to meet the requirements of the transaction scheme provider in respect of user management and secure transaction handling, so both may require qualification with the transaction scheme provider before use.

FIG. 3C shows a merchant server 12. The merchant server 12 also possesses at least one processor 31b and at least one memory 32b, between them defining a computing environment 33b for performance of applications. This shows a merchant server side application 336 for interaction with customers, a merchant back office system 337 for order management, and a merchant payment management system 338 for handling user payments and reconciliation. As will be described, some of the actions that may elsewhere be handled by a merchant payment management system are delegated to the payment facilitator 19, so the role of the merchant payment management system 338 is restricted in scope. In practice, some (or all) of these application functions may be distributed between different interacting servers, though these are shown here as operating within one computing environment for convenience of description.

Operation of embodiments of the disclosure will now be described with relevance to various performance stages: merchant set-up, user set-up, and transaction performance. These different stages rely to some degree on the payment facilitator server. Set-up of the payment facilitator server itself is not described in detail here as the person skilled in the art will be able to determine how to provide this from the payment facilitator server functionality, save to note that the transaction scheme provider and any other party relying on the payment facilitator server must be confident that the payment facilitator server will behave consistently as intended and will hold data as securely as it is required to do. Set-up of the payment facilitator server will typically be at least as demanding as setting up a new merchant account using a conventional merchant set-up approach. The benefit is, however, that the payment facilitator server is able to set-up and onboard merchants and users in a much simpler way that is less time and resource consuming way.

Figure 4:
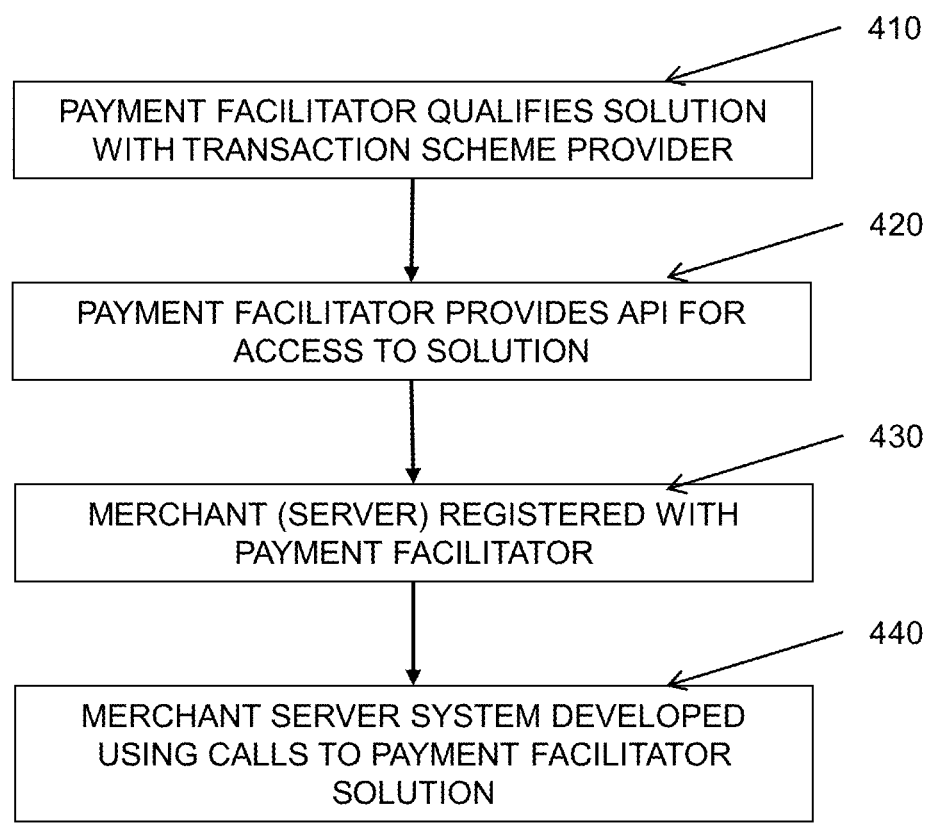
FIG. 4 describes a merchant set-up process in accordance with embodiments of the disclosure.

Initial set-up of the merchant is described in FIG. 4. The payment facilitator develops a solution for the necessary payment steps—in particular, user authentication and express payment suitable for use with QR code based transactions—and qualifies 410 this solution with the transaction scheme provider. The payment facilitator provides 420 an API, SDK or other access system for the solution so that this solution can be built in to other applications. The merchant is registered 430 with the payment facilitator so that the merchant can use the payment facilitator service, and the type of use may be specified. For example, different service options may involve the payment facilitator initiating transactions specifically on behalf of the merchant, or initiating transactions on its own behalf and then settling separately with the merchant. The latter option may be useful if the merchant is small and best aggregated with others in a user group represented by the payment facilitator service, for example if the customer would be more likely to trust the payment facilitator than the merchant. The merchant server system is then developed using calls 440 to the payment facilitator solution during the transaction flow.

Figure 5:
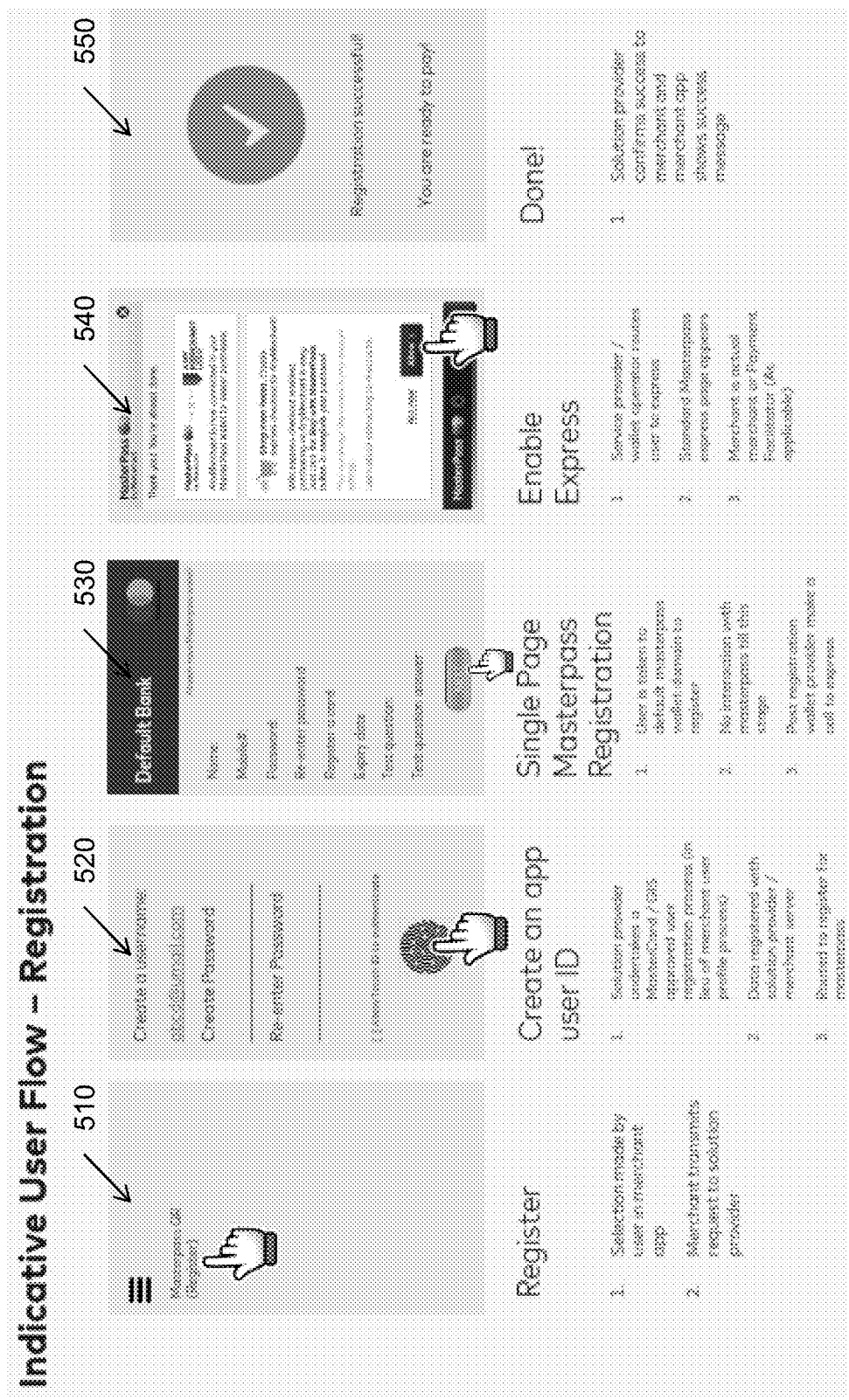
FIG. 5 describes a user set-up process in accordance with embodiments of the disclosure.

A process of user registration for QR code payment using this approach is described with respect to FIG. 5. FIG. 5 shows a sequence of user screens for a user to payment facilitator interaction—in this case, the user screens are appropriate to a smartphone device, but it will be appreciated that a similar set of interactions may be achieved using another type of computing device.

Firstly, the user is presented with a Masterpass QR registration screen—this may be reached by, for example, selecting Masterpass QR as a payment option within a merchant server application in the process of making an order from the merchant site. On selection (screen 510), the merchant server uses its standard interface to the payment facilitator, and the following interaction is between the user and the payment facilitator.

The payment facilitator then creates a user ID for the user (screen 520). A username and password are created by the user, and the user may enable a biometric application such as Touch ID as an authentication option. This user ID is shared by the payment facilitator with the merchant.

The payment facilitator, who remains in control of the process, then routes the user to a default Masterpass registration domain (screen 530) such as wallet service 17. This allows a Masterpass registration to be carried out on behalf of whichever issuing bank is appropriate to allow the user to register for Masterpass. User details are entered, along with card details and any other credentials needed for registration. The wallet service 17 may then enable the user to make express payment using Masterpass QR. The user is routed to the express service (directly or indirectly via the wallet service) 17 and a standard permission page (screen 540) is provided, enabling the user to allow express payment between the user and a specified merchant. There are two possible use models here—the specified merchant may be the merchant itself, or it may be the payment facilitator if it acts as an aggregator for a number of merchants. When this step is complete, control is handed back to the merchant server and a successful registration message (screen 550) is provided. Masterpass QR and Masterpass Express are here examples of suitable QR payment and express payment protocols using a wallet service—alternative applications with similar functionality may be used in other embodiments.

This approach allows the merchant direct access to a payment mechanism that is particularly suitable for QR payment without requiring the merchant to qualify its solution with the transaction scheme provider, as the relevant parts of the solution are provided by the payment facilitator and already qualified. This allows a merchant server system to be developed faster and more cheaply.

Figure 6:
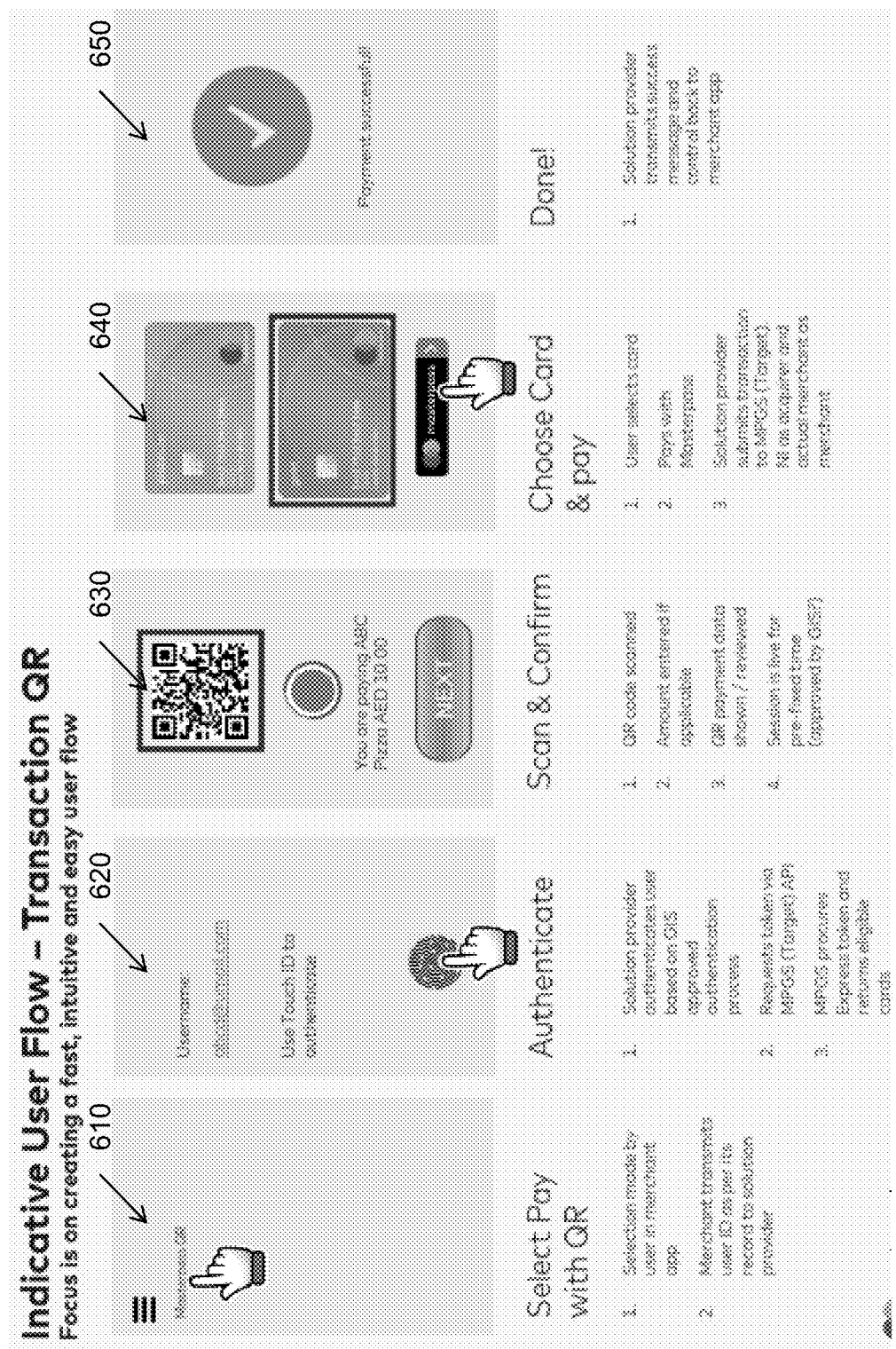
FIG. 6 describes a general transaction process in accordance with embodiments of the disclosure.

After registration and enrolment for a rapid payment mechanism (such as Masterpass Express), the user is able to perform a QR transaction. The flow of control is similar. An example of this is shown in FIG. 6, again with reference to user screens of the user's device. The user selects the option to pay using Masterpass QR (screen 610) in the merchant server application or app. The merchant has a record of the customer user ID from the registration process and passes control to the payment facilitator to perform authentication. The payment facilitator then authenticates (screen 620) the user using an approved authentication process (for example, Touch ID). The QR code generated by or on behalf of the merchant server to represent the transaction is then scanned—this QR code may have an amount included (a dynamic QR), or may merely provide merchant details (static QR) with the transaction amount to be entered by the user. QR payment data is shown to the user (screen 630) so that the user can confirm that the transaction is correct and should move to completion. The user is then given access to their wallet to determine (screen 640) which card to use and to make a payment using Masterpass (which may be specifically a Masterpass Express payment). The payment facilitator provides the interface to the transaction infrastructure—the transaction is submitted to the internet payment gateway, with the actual merchant identified as merchant for the transaction, with the acquirer for the transaction being an entity that uses the payment facilitator's services. Success is indicated to the user (screen 650).

This approach provides an effective user experience and provides control in performance of the transaction. This is particularly helpful when there is a separation between ordering of goods and services and their performance, as will be discussed below, in that it allows payment to be matched more directly with the receipt of goods or services by the customer.

Figure 7:
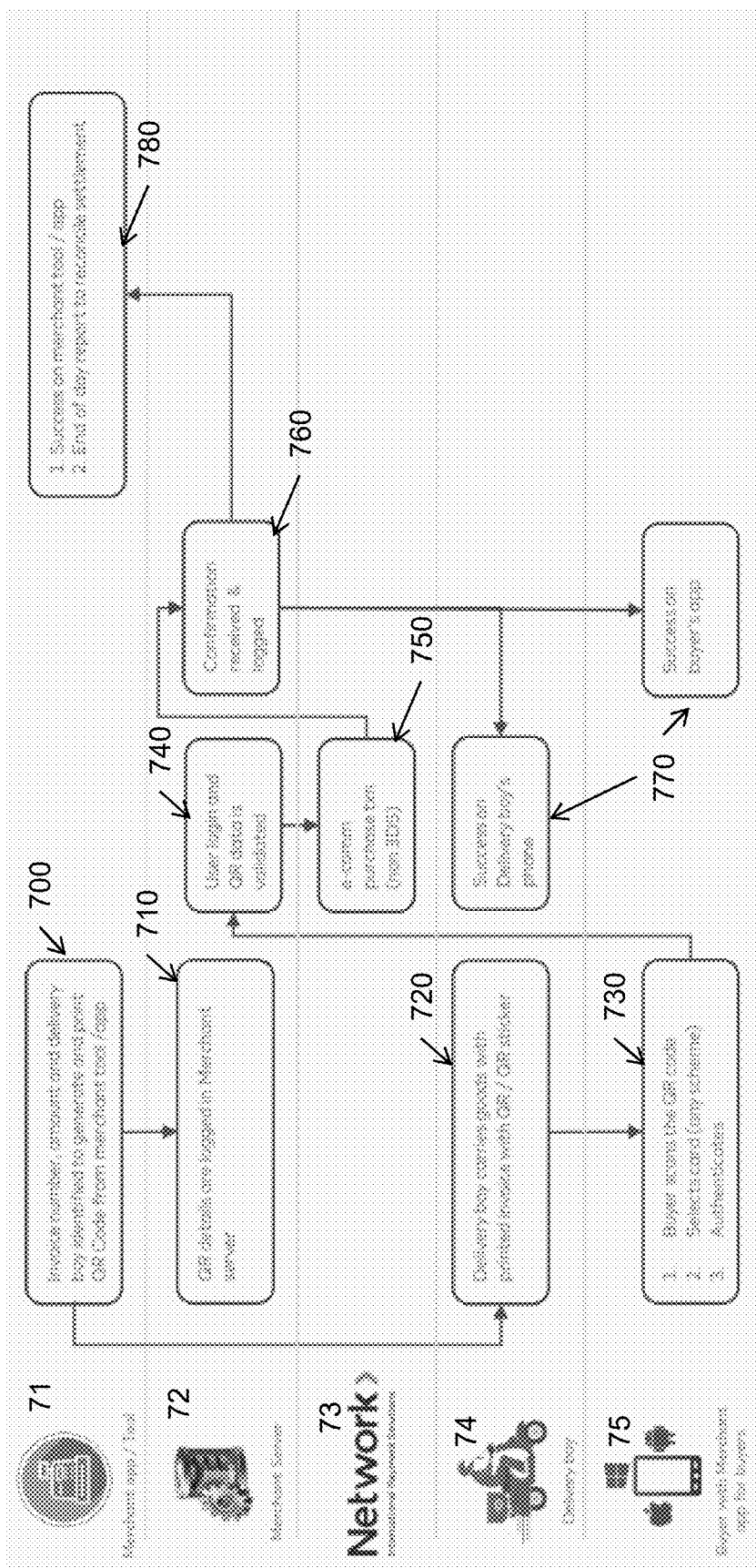
FIG. 7 illustrates implementation of an embodiment of the disclosure relating to transaction and home delivery.
Figure 8:
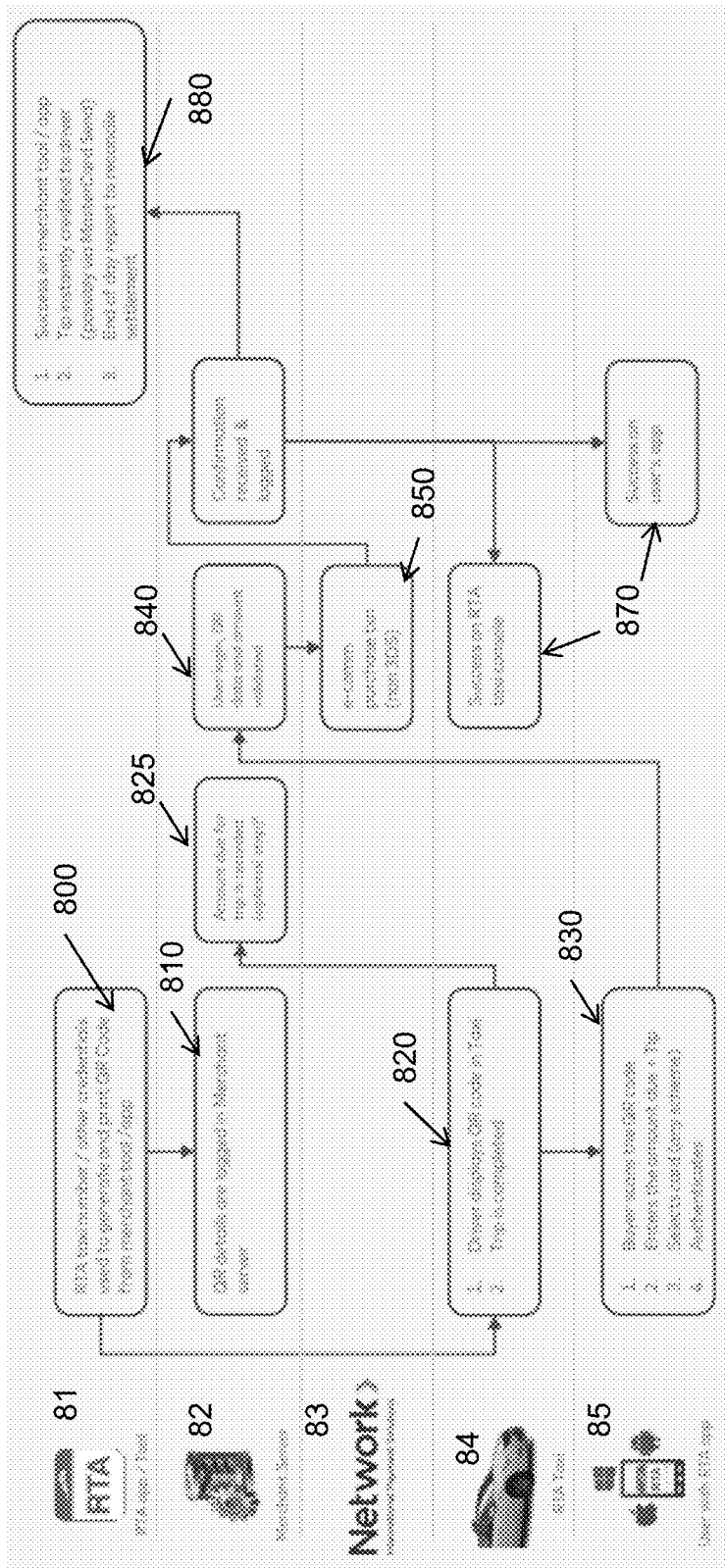
FIG. 8 illustrates implementation of an embodiment of the disclosure relating to booking and performance of a service.

This approach can be employed effectively in a variety of use models. FIGS. 7 and 8 illustrate exemplary solutions for two different use models utilising this approach.

FIG. 7 relates to a solution for home deliveries using QR code payment. This is an appropriate model to use here as it allows security and control for all parties, in that completion of the transaction is deferred to the point of delivery but the delivery person does not need to take an active role in the transaction. In the embodiment shown, a dynamic QR code is used, but a static QR code could also be used (as will be described in connection with the FIG. 8 embodiment). The solution uses a merchant app or tool 71 associated with a merchant server 72, a payment facilitator 73, a delivery person 74 and a customer 75 with the customer version of the merchant app.

After an initial purchase interaction—which may simply establish basic transaction parameters (what is being bought, who is buying it, where it is to be delivered to, what it costs) without an authorisation step, as the transaction is not yet taking place—the merchant app identifies 700 an invoice identifier, purchase amount and delivery person, and uses some or all of this information in generating a QR code. In this example, it is assumed that all this information is provided in the QR code. These QR details are then logged 710 at the merchant server 72. The delivery person 74 then carries 720 the goods, along with the invoice and a sticker with the QR code, to the customer 75.

The customer 75 scans 730 the QR code sticker with his or her phone and in this case will see that the invoice identifier matches the invoice provided with the goods, the price matches that used in the transaction and the delivery person is identified. The customer 75 is then confident to select a card (in a standard MasterPass interaction) and provide authentication to initiate the transaction. The authentication step logs the customer 75 in to the merchant server 72 and validates 740 the data, providing this data to the payment facilitator 73 to initiate 750 the transaction. Confirmation 760 that the transaction is authorised is provided to the merchant server 72, which provides 770 this confirmation, separately, to both the delivery person 74 and the customer 75, at which point both the delivery person 74 and the customer know that the goods can be safely passed to the customer. The merchant server 72 will also advise 780 the merchant side merchant app of the transaction success, and this will be included in the end of day report provided for reconciliation purposes.

FIG. 8 relates to a solution for taxi service payment using static QR codes. In this case, a road traffic authority (RTA) app 81 is used with a merchant server 82 to provide a taxi 84 to a customer 85, again using the agency of a payment facilitator 83.

In this case, as a static QR code is used, no transaction specific details are required—a static QR code is printed and displayed 800 providing relevant credentials for the taxi such as an RTA taxi number. The QR details are logged 810 in the merchant server 82, and the QR code is displayed 820 while the customer is in the taxi 84. At the completion of the trip 830 the customer 85 scans the QR code, which identifies the taxi and opens a payment window. The customer enters the amount of the fare (and any tip), then completes the requirements for the transaction by selecting a card and authenticating. The trip amount may optionally have been recorded 825 at the merchant server 82 before this stage.

As before, authentication enables user login 840 to the merchant server and validation of the QR data (and potentially also the amount), which is then passed 850 to the payment facilitator to initiate the transaction. Authorisation of the transaction is communicated 860 to the merchant server and logged, and subsequently communicated 870 by the merchant server 82 to the taxi 84 and the customer 85. The merchant server 82 will also advise 880 the RTA app of the transaction success, and this will be included in the end of day report provided for reconciliation purposes—if any tip is provided, this may be credited directly to an account of the relevant driver (a personal payment mechanism such as MasterCard Send can be used for this purpose).

While this approach is particularly effective when goods or services are ordered at a different place or time from fulfilment of the order, embodiments of the disclosure are also effective for face-to-face transactions, for example between a customer and a small merchant. While use of QR codes and QR payment is discussed here, embodiments of the disclosure may use other bar code types or other visual codes such as glyphs—embodiments may even use a non-visual coding mechanism. The skilled person will appreciate that the embodiments described here are exemplary, and that modifications may be made and alternative embodiments provided that fall within the scope of the disclosure.

The invention claimed is:

1. A method for improving security in an online transaction between a merchant and a customer involving a first computing device associated with the merchant, a second computing device associated with the customer and a payment facilitator computing system associated with a payment facilitator, wherein the method comprises operations performed by the second computing device that include:
    entering into an agreement with the first computing device for a transaction that includes at least a purchase amount;
    scanning a code image carried by a delivery person;
    based on the scanning, visually displaying an invoice identifier to the customer;
    receiving, from the customer, a confirmation that the customer has visually determined that the invoice identifier on the code image matches an invoice provided by the delivery person, and that a price shown on the code image matches the purchase amount;
    based on the confirmation, causing the customer to select a payment card and provide authentication data associated with the payment card;
    responsive to receiving the authentication data, providing the authentication data to the first computing device and the payment facilitator computing system, allowing an online payment to the merchant to be made via an internet payment gateway;
    based on the received authentication data, causing the payment facilitator computing system to initiate the transaction;
    receiving a confirmation of authorization of the transaction from the payment facilitator computing system; and
    allowing receiving of goods associated with the transaction, by the customer from the delivery person, based on the received confirmation of the authorization of the transaction.

2. The method of claim 1, wherein the confirmation further includes an indication that the delivery person is identified.

3. The method of claim 1, wherein the method comprises further operations performed by the second computing device comprising providing the authenticating data to the payment facilitator computing system based on a user identification (ID) received during registration of the customer with the payment facilitator computing system, thereby allowing the customer to be authenticated by the payment facilitator computing system.

4. The method of claim 1, wherein the first computing device is configured to provide a confirmation that the transaction is authorized to the customer and the delivery person, wherein based on receiving the confirmation that the transaction is authorized, the delivery person is configured to deliver the goods associated with the transaction to the customer.

5. The method of claim 3, wherein the user ID is shared with the first computing device during the registration of the customer with the payment facilitator computing system allowing the user ID to be used during the transaction.

6. The method of claim 1, wherein the code image is dynamic, and comprises elements associated with the first computing device and elements that are specific to the transaction.

7. The method of claim 1, wherein the agreement takes place before provision of the goods to the customer, and scanning the code image and initiating the transaction take place after provision of the goods to the customer.

8. The method of claim 1, wherein the code image and the goods are provided by the delivery person to the customer, and wherein the customer and the delivery person are notified on success of the transaction.

9. The method of claim 1, wherein the transaction comprises payment for the goods delivered by the merchant to the customer.

10. A computing system associated with a customer for improving security in an online transaction between a merchant and the customer involving a first computing device associated with the merchant and, a payment facilitator computing system, the computing system associated with the customer including a second computing device comprising a processor, and at least one memory operationally coupled to the processor, wherein the processor is configured to perform, in conjunction with the at least one memory, operations comprising:
    entering into an agreement with the first computing device for a transaction that includes at least a purchase amount;
    scanning a code image carried by a delivery person;
    based on the scanning, visually displaying an invoice identifier to the customer;
    receiving, from the customer a confirmation that the customer has visually determined that the invoice identifier on the code image matches an invoice provided by the delivery person, and that a price shown on the code image matches the purchase amount;
    based on the confirmation, causing the customer to select a payment card and provide authentication data associated with the payment card;
    responsive to receiving the authentication data, providing the authentication data to the first computing device and the payment facilitator computing system, allowing an online payment to the merchant to be made via an internet payment gateway;

based on the received authentication data causing the payment facilitator computing system to initiate the transaction;

receiving a confirmation of authorization of the transaction from the payment facilitator computing system; and allowing receiving of goods associated with the transaction, by the customer from the delivery person, based on the received confirmation of the authorization of the transaction.

11. The computing system as claimed in claim 10, wherein the processor is configured to perform further operations comprising providing the authenticating data to the payment facilitator computing system based on a user identification (ID) received during registration of the customer with the payment facilitator computing system, thereby allowing the customer to be authenticated by the payment facilitator computing system.

12. The computing system of claim 10, wherein the payment facilitator computing system is configured to provide a user interface for inclusion in third party systems to allow users of third party applications to be directed to the payment facilitator computing system for performance of a transaction.

13. The computing system of claim 10, wherein the payment facilitator computing system is adapted to receive a notification of success of the transaction, and in turn to provide the notification to the customer and the merchant, or the delivery person.

14. The computing system of claim 13, wherein the notification of success is provided to a computing device of the delivery person, wherein the delivery person directly provides the goods to the customer.

15. A non-transitory computer readable medium having computer executable instructions for enabling an online transaction between a merchant and a customer involving a first computing device associated with the merchant, a second computing device associated with the customer and a payment facilitator computing system associated with a payment facilitator, wherein the instructions when executed by a processor of the second computing device, cause the processor to perform operations comprising:

entering into an agreement with the first computing device for a transaction that includes at least a purchase amount;

scanning a code image carried by a delivery person;

based on the scanning, displaying an invoice identifier;

receiving, from the customer, a confirmation that the customer has visually determined that the invoice identifier on the code image matches an invoice provided by the delivery person, and that a price shown on the code image matches the purchase amount;

based on the confirmation, causing the customer to select a payment card and provide authentication data associated with the payment card;

responsive to receiving the authentication data, providing the authentication data to the first computing device and the payment facilitator computing system, allowing an online payment to the merchant to be made via an internet payment gateway;

based on the received authentication data, causing the payment facilitator computing system to initiate the transaction;

receiving a confirmation of authorization of the transaction from the payment facilitator computing system; and allowing receiving of goods associated with the transaction, by the customer from the delivery person, based on the received confirmation of the authorization of the transaction.

16. The non-transitory computer readable medium of claim 15, wherein the code image and the goods are provided by the delivery person to the customer, and wherein the customer and the delivery person are notified on success of the transaction.

17. The non-transitory computer readable medium of claim 15, wherein the second computing device scans the code image carried by the delivery person and provides data included in the code image to the payment facilitator computing system.

18. The non-transitory computer readable medium of claim 15, wherein the code image is dynamic, and comprises elements associated with the first computing device and elements that are specific to the transaction.

19. The non-transitory computer readable medium of claim 15, wherein the confirmation further includes an indication that the delivery person is identified.

20. The computing system as claimed in claim 10, wherein the confirmation further includes an indication that the delivery person is identified.

* * * * *